United States Patent
Kim et al.

(10) Patent No.: US 12,427,483 B2
(45) Date of Patent: Sep. 30, 2025

(54) FEED SIDE SPACER AND SEPARATION MEMBRANE ELEMENT

(71) Applicant: LG CHEM, LTD., Seoul (KR)

(72) Inventors: Taehyeong Kim, Daejeon (KR); Dae Hun Kim, Daejeon (KR); Taeyoung Park, Daejeon (KR); Phill Lee, Daejeon (KR); Kyunghoon Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 514 days.

(21) Appl. No.: 17/621,349

(22) PCT Filed: Sep. 25, 2020

(86) PCT No.: PCT/KR2020/013087
§ 371 (c)(1),
(2) Date: Dec. 21, 2021

(87) PCT Pub. No.: WO2021/066405
PCT Pub. Date: Apr. 8, 2021

(65) Prior Publication Data
US 2022/0370959 A1 Nov. 24, 2022

(30) Foreign Application Priority Data
Oct. 2, 2019 (KR) .................. 10-2019-0122323

(51) Int. Cl.
*B01D 63/10* (2006.01)
*B01D 65/08* (2006.01)

(52) U.S. Cl.
CPC ............. *B01D 63/10* (2013.01); *B01D 65/08* (2013.01); *B01D 2313/143* (2013.01)

(58) Field of Classification Search
CPC ........ B01D 63/10; B01D 65/08; B01D 65/00; B01D 2313/143; B01D 63/103; B01D 2313/08; H02H 9/04
See application file for complete search history.

(56) References Cited

U.S. PATENT DOCUMENTS

| 8,361,318 B2 | 1/2013 | Chikura et al. | |
| 2003/0205520 A1* | 11/2003 | Johnson | B01D 63/103 210/321.83 |

(Continued)

FOREIGN PATENT DOCUMENTS

| EP | 1464377 A1 | 10/2004 |
| JP | H05168869 | 7/1993 |

(Continued)

OTHER PUBLICATIONS

Purchas et al., "Chapter 6: Screens and Meshes." in Handbook of Filter Media, Elsevier Science (2002), pp. 201-259.

*Primary Examiner* — Hayden Brewster
(74) *Attorney, Agent, or Firm* — Bryan Cave Leighton Paisner, LLP

(57) ABSTRACT

Provided is a feed side spacer comprising a network structure, wherein the network structure includes a hexagonal eye, the hexagonal eye includes a pair of parallel portions parallel to a flow direction of a supply liquid, and an inclined portion disposed in a diagonal direction with respect to the flow direction of the supply liquid; the parallel portion has a length of 1 mm to 5 mm; the inclined portion has a length of 5.1 mm to 10 mm; and an angle formed by sides in contact with each other of the inclined portion is from 50° to 80°, and a separation membrane element comprising same.

9 Claims, 4 Drawing Sheets

[HEXAGON A]

(56) References Cited

U.S. PATENT DOCUMENTS

| | | | |
|---|---|---|---|
| 2007/0175812 A1* | 8/2007 | Chikura | B01D 63/10 210/321.88 |
| 2008/0190836 A1* | 8/2008 | Beppu | B01D 63/101 210/321.74 |
| 2010/0096316 A1* | 4/2010 | Chikura | B01D 63/101 210/321.83 |
| 2010/0108593 A1 | 5/2010 | Chikura et al. | |
| 2012/0037562 A1 | 2/2012 | Beppu et al. | |
| 2018/0207586 A1 | 7/2018 | Choi et al. | |
| 2019/0282962 A1 | 9/2019 | Konda et al. | |
| 2020/0086276 A1 | 3/2020 | Lee et al. | |
| 2020/0164315 A1 | 5/2020 | Okazaki et al. | |

FOREIGN PATENT DOCUMENTS

| | | |
|---|---|---|
| JP | 2009-195870 | 9/2009 |
| JP | 2011-072910 | 4/2011 |
| JP | 4688140 | 5/2011 |
| JP | 2018-086642 | 6/2018 |
| JP | WO2018-056090 | 7/2019 |
| KR | 10-2007-0031279 | 3/2007 |
| KR | 10-2007-0074653 | 7/2007 |
| KR | 10-2011-0067275 | 6/2011 |
| KR | 10-2011-0129910 | 12/2011 |
| KR | 10-2016-0141076 | 12/2016 |
| KR | 10-2017-0038646 | 4/2017 |
| KR | 10-2019-0044270 | 4/2019 |

* cited by examiner

[FIG. 1]
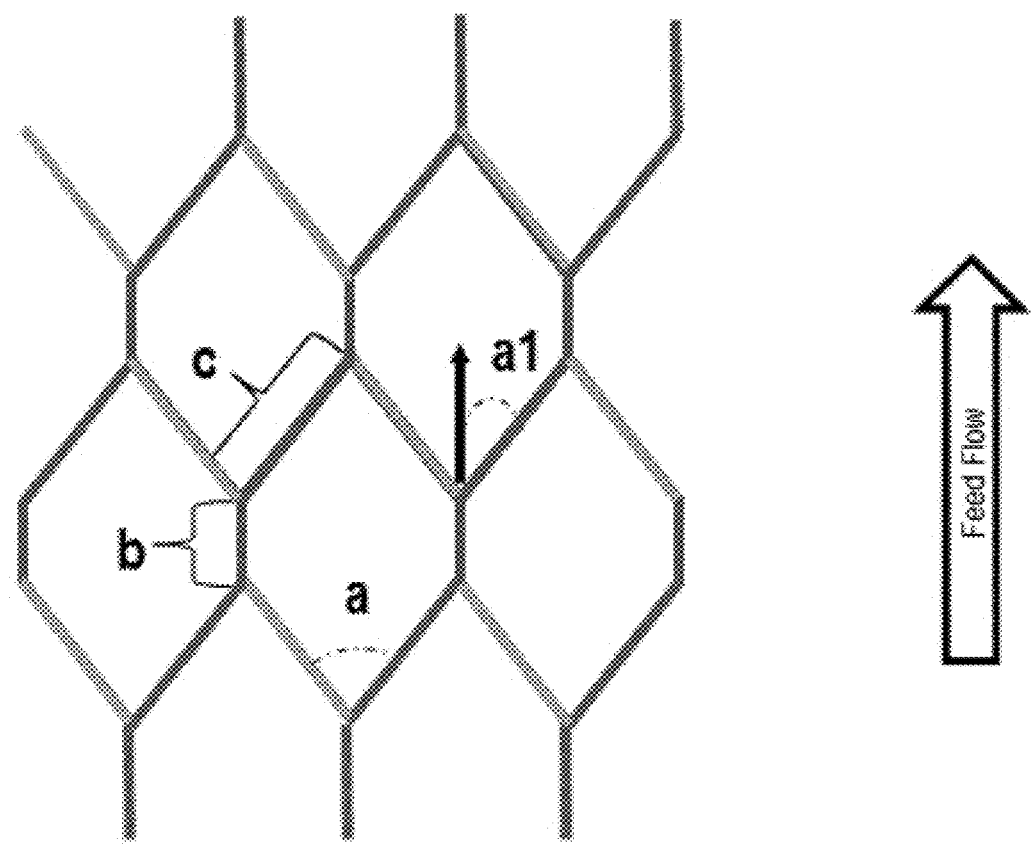
[HEXAGON A]

[FIG. 2]
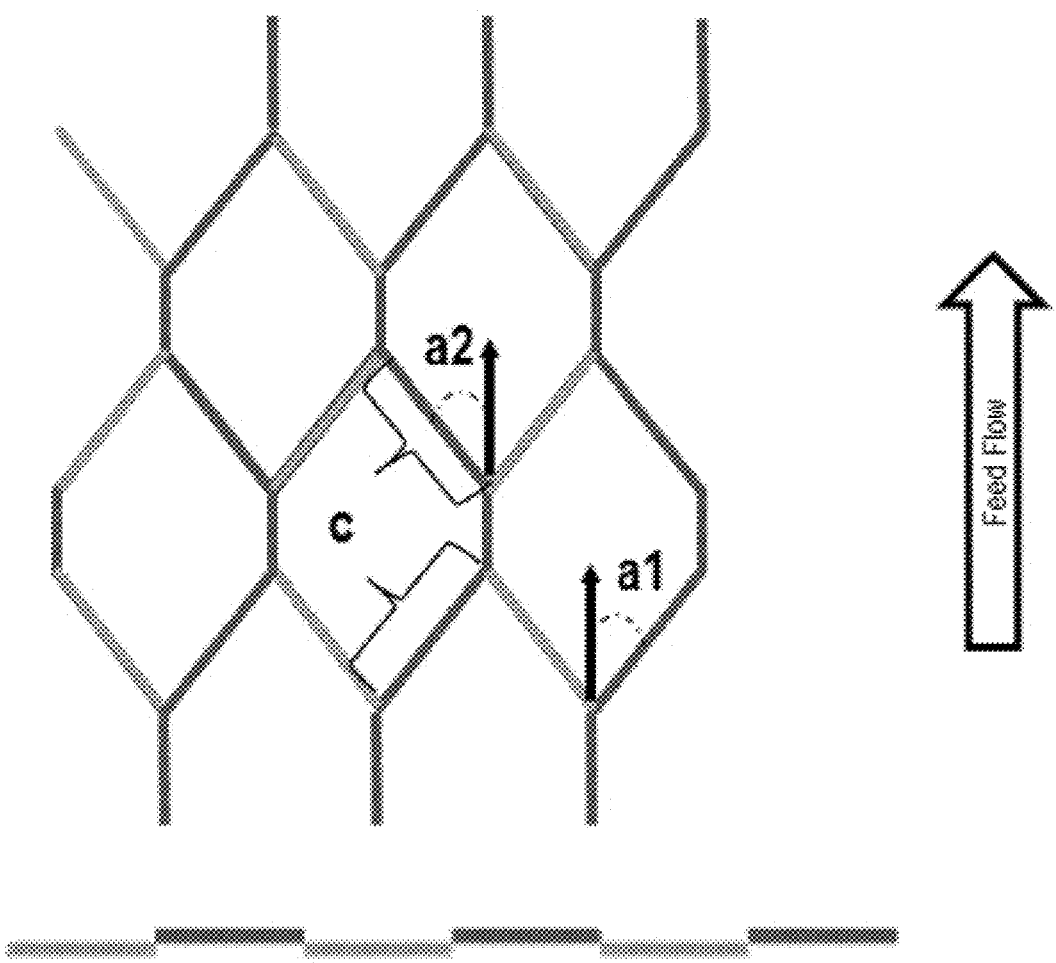
[HEXAGON B]

[FIG. 3]
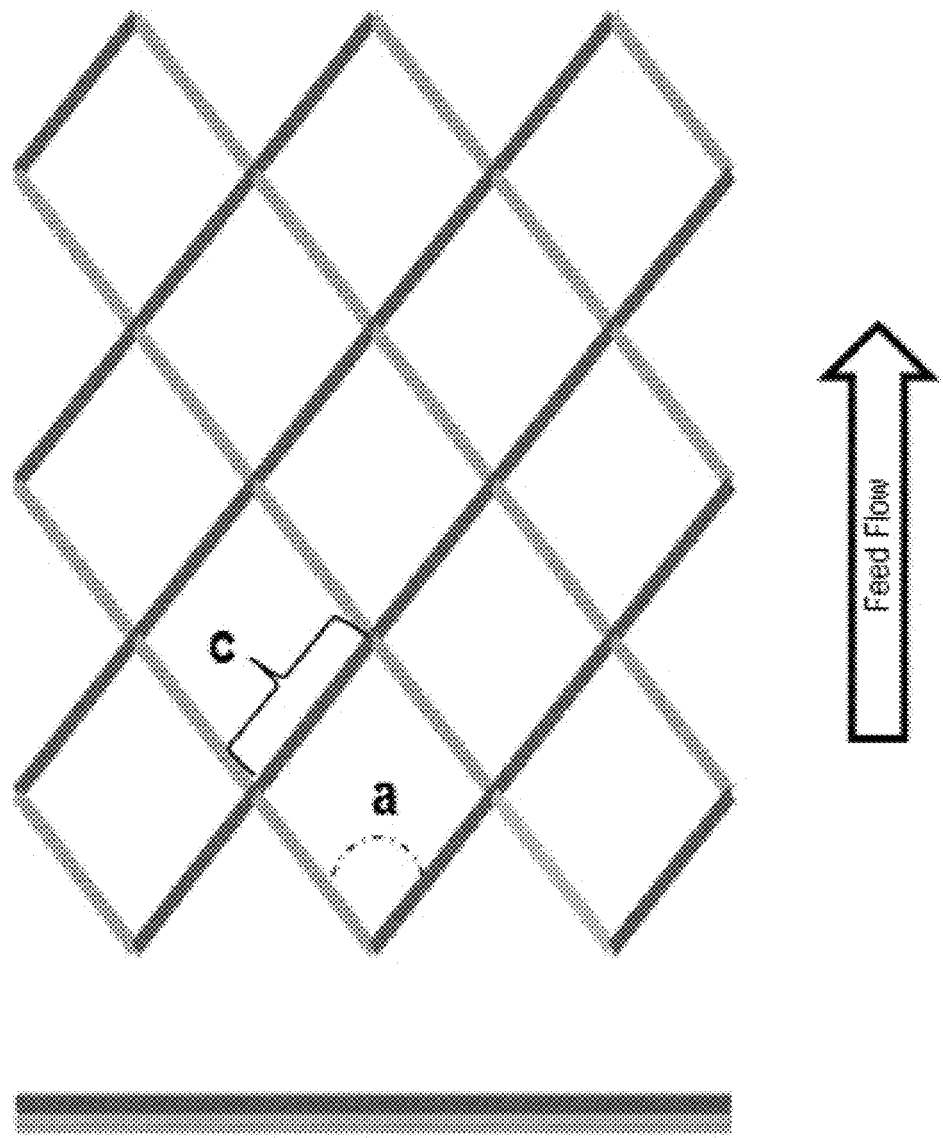
[DIAMOND]

[FIG. 4]
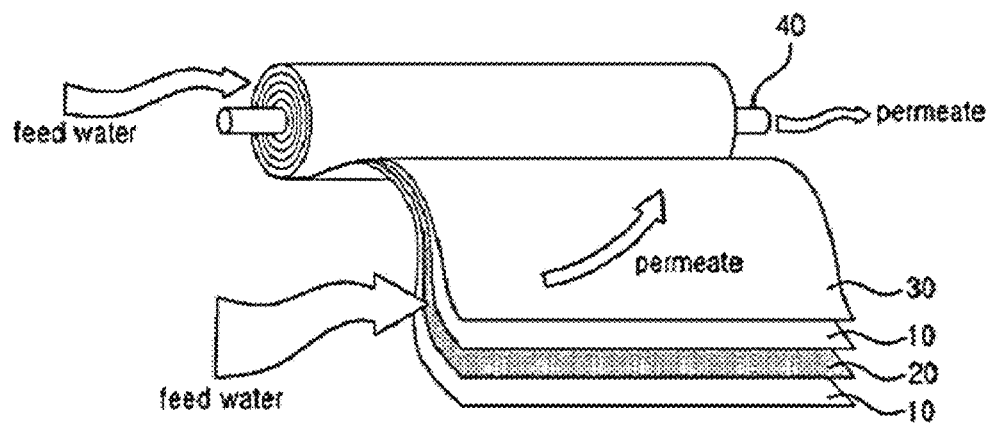

FEED SIDE SPACER AND SEPARATION MEMBRANE ELEMENT

CROSS-REFERENCE TO RELATED APPLICATIONS

This application is a National Stage Application of International Application No. PCT/KR2020/013087 filed on Sep. 25, 2020, which claims priority to and the benefits of Korean Patent Application No. 10-2019-0122323, filed with the Korean Intellectual Property Office on Oct. 2, 2019, the entire contents of which are incorporated herein by reference.

TECHNICAL FIELD

The present specification relates to a feed-side flow-channel member and a separation membrane element.

BACKGROUND

A spiral wound-type separation membrane element requires a certain space for raw water to flow, and therefore, a mesh-shaped flow-channel member (mesh-type spacer) is generally used.

However, a role of the flow-channel member is not only to simply provide a flow channel, but also to generate more flow convection in the raw water channel in order to mitigate ion polarization (concentration polarization) occurring near an interface of the separation membrane.

Accordingly, development of a flow-channel member for enhancing performance of a spiral wound-type separation membrane element has been required.

BRIEF DESCRIPTION

Technical Problem

The present specification is directed to providing a feed-side flow-channel member, and a separation membrane element with enhanced differential pressure reduction and salt rejection.

Technical Solution

One embodiment of the present specification provides a feed-side flow-channel member including a network structure, wherein the network structure includes a hexagonal eye, and the hexagonal eye includes a pair of parallel portions parallel to a flow direction of a supply liquid, and an inclined portion disposed in a diagonal direction with respect to the flow direction of the supply liquid, a length of the parallel portion is from 1 mm to 5 mm, a length of the inclined portion is from 5 mm to 10 mm, and an angle formed by sides in contact with each other of the inclined portion is from 50° to 80°.

One embodiment of the present specification provides a separation membrane element including the feed-side flow-channel member; a separation membrane; and a permeation-side flow-channel member.

Advantageous Effects

Using a feed-side flow-channel member according to the present specification in a separation membrane element can reduce a differential pressure and optimize concentration polarization.

DESCRIPTION OF THE DRAWINGS

FIG. 1 and FIG. 2 each illustrate a feed-side flow-channel member according to one embodiment of the present specification.

FIG. 3 illustrates a feed-side flow-channel member of a comparative example.

FIG. 4 illustrates a separation membrane element according to one embodiment of the present specification.

DETAILED DESCRIPTION

In the present application, a description of a certain member being placed "on" another member includes not only a case of the one member being in contact with the another member but a case of still another member being present between the two members.

In the present specification, a certain part "including" certain constituents means capable of further including other constituents, and does not exclude other constituents unless particularly stated on the contrary.

One embodiment of the present specification provides a feed-side flow-channel member including a network structure, the network structure includes a hexagonal eye, and the hexagonal eye includes a pair of parallel portions parallel to a flow direction of a supply liquid, and an inclined portion disposed in a diagonal direction with respect to the flow direction of the supply liquid, a length of the parallel portion is from 1 mm to 5 mm, a length of the inclined portion is from 5 mm to 10 mm, and an angle formed by sides in contact with each other of the inclined portion is from 50° to 80°.

Creating more flow convection in a raw water channel through a feed-side flow-channel member reduces polarization, which improves properties such as salt rejection or permeability of product water. However, a pressure loss caused by an increased flow friction generates a larger differential pressure in a spiral wound-type separation membrane element structure resulting in an increase in operating costs.

In view of the above, the applicant has invented a feed-side flow-channel member capable of minimizing a pressure loss in a raw water channel while generating effective flow convection on a separation membrane surface.

Specifically, by the feed-side flow-channel member according to the present specification employing a network structure including a hexagonal eye instead of an existing network structure including a diamond-type eye, a separation membrane element including the feed-side flow-channel member can minimize a differential pressure while maintaining salt rejection.

In the minimizing of a differential pressure, the 'differential pressure' means a difference in the pressures between feed water and concentrated water of the separation membrane element. Specifically, it means a difference in the pressure reduced by friction generated from a network structure (net) of the feed-side flow-channel member while raw water supplied to the separation membrane element at a certain pressure passes through the feed-side flow-channel member (feed spacer) in the separation membrane element.

The existing feed-side flow-channel member having a network structure including a diamond-type eye causes a turbulent flow and thereby reduces a concentration of salt water on a separation membrane surface. However, such a turbulent flow interrupts the raw water flow and can generate a differential pressure.

Although the turbulent flow needs to be reduced in order to reduce a differential pressure, reducing a turbulent flow (reducing mixing) increases concentration polarization, which can cause a decrease in the salt rejection or flow rate of a separation membrane element.

The concentration polarization means a phenomenon in which raw water supplied at a certain concentration is partially concentrated while being filtered on a separation membrane surface, and the concentration becomes higher than the concentration of the supplied raw water. Depending on the structure shape of the flow-channel member, the degree of the generated turbulent flow affects the mixing phenomenon on the separation membrane surface, which can resultantly affect concentration polarization.

Meanwhile, a decrease in the concentration of the separation membrane surface caused by an increase in the turbulent flow has a limit at a certain level or higher. As a result, excessive turbulent flow generation increases a differential pressure only and is not able to contribute to a decrease in the concentration of the separation membrane surface, and therefore, an optimization thereof is required.

In view of the above, the feed-side flow-channel member according to the present specification includes a network structure including a hexagonal eye, and by optimizing arrangement and angle of a first constituent yarn and a second constituent yarn forming the network structure, an increase in the concentration polarization is minimized, and the differential pressure can also be minimized while maintaining salt rejection.

In the present specification, the feed-side flow-channel member means a fabric or a knitted fabric serving as a flow channel creating a space through which a supply liquid inflowing through a supply path can flow out in the separation membrane element, and has a porous surface structure so as to create a space through which the raw water flows out. The feed-side flow-channel member can mean a feed spacer.

In the present specification, the network structure can mean a structure entangled with each other like a net.

In the present specification, the "hexagon" of the hexagonal eye can mean a figure having six sides. Two of the six sides form a pair of parallel portions, and the remaining four sides form two pairs of inclined portions.

In the present specification, the "hexagonal eye" means one hexagonal eye. In other words, the above-mentioned network structure can be formed using the one hexagonal eye as a repeating unit structure.

In the present specification, the flow direction of the supply liquid means a length direction of a center tube included in the separation membrane element including the feed-side flow-channel member. In other words, it means a direction parallel to the axial center of the center tube.

In the present specification, being parallel does not necessarily satisfy an absolute definition of geometry, and can mean being arranged side by side without meeting each other.

In the present specification, being diagonal means a direction that is not parallel with the flow direction of the supply liquid. In other words, it can mean being arranged to meet with the flow direction of the supply liquid.

In one embodiment of the present specification, the hexagonal eye can include two pairs of inclined portions. In the two pairs of inclined portions, each inclined portion facing each other can be parallel.

In one embodiment of the present specification, the parallel portion has a length of 1 mm to 5 mm. Specifically, the parallel portion has a length of 1 mm to 4 mm. More specifically, the parallel portion has a length of 1.44 mm to 3.5 mm.

In the present specification, the "length of parallel portion" means a length of a parallel portion of one side in the pair of parallel portions included in the one hexagonal eye described above. Specifically, when referring to FIG. 1, it means a length of the part expressed as b.

In one embodiment of the present specification, the inclined portion has a length of 5 mm to 10 mm. Specifically, the inclined portion has a length of 5 mm to 6 mm. As one example, the inclined portion has a length of 5.1 mm to 6 mm. More specifically, the inclined portion has a length of 5.1 mm to 5.7 mm. As one example, the inclined portion has a length of 5.4 mm to 5.7 mm. More specifically, the inclined portion has a length of 5.42 mm to 5.7 mm.

In the present specification, the "length of inclined portion" means a length of an inclined portion of one side in the two pairs of inclined portions included in the one hexagonal eye described above. Specifically, when referring to FIG. 1, it means a length of the part expressed as c.

When the length of the inclined portion satisfies the above-mentioned range, particularly the range of 5.1 mm to 5.7 mm, a differential pressure can decrease by reducing resistance in the flow direction of the supply liquid.

In one embodiment of the present specification, an angle formed by the sides in contact with each other of the inclined portion is from 50° to 80°. Specifically, the angle is from 50° to 75°, and more specifically from 55° to 59°.

The "angle formed by sides in contact with each other of inclined portion" can mean an angle formed by straight lines forming the inclined portion meeting each other.

When the angle formed by the sides in contact with each other of the inclined portion satisfies the above-mentioned range, a differential pressure can decrease by reducing resistance in the flow direction of the supply liquid.

Specifically, when the angle foamed by the sides in contact with each other of the inclined portion satisfies the above-mentioned range, particularly 55° to 59° a differential pressure can decrease by reducing resistance in the flow direction of the supply liquid.

In one embodiment of the present specification, the network structure includes a first constituent yarn and a second constituent yarn.

Materials of the first constituent yarn and the second constituent yarn are not particularly limited, and general materials known in the art can be properly employed.

In one embodiment of the present specification, the hexagonal eye includes a first constituent yarn and a second constituent yarn, and when the first constituent yarn and the second constituent yarn form the parallel portion, the first constituent yarn and the second constituent yarn are in contact with each other.

The being in contact with each other can mean the first constituent yarn and the second constituent yarn foaming the parallel portion being arranged side by side and in contact with each other without being twisted. In one example, the being arranged side by side and in contact with each other can mean being fused.

The feed-side flow-channel member can be prepared referring to preparation methods and conditions described in the reference document "Purchas, D. B.; Sutherland, K. Handbook of Filter Media; Elsevier, 2002 Chapter 6 Screens and Meshes".

In one embodiment of the present specification, the first constituent yarn and the second constituent yarn each independently have a thickness of 300 μm to 500 μm.

The thicknesses of the first constituent yarn and the second constituent yarn can be measured from a top-view using a microscope.

In one embodiment of the present specification, the inclined portion is disposed diagonally in the same direction with respect to the flow direction of the supply liquid.

The inclined portion being disposed diagonally in the same direction with respect to the flow direction of the supply liquid means, as in FIG. 1, any one inclined portion having an angle of inclination inclined at an angle of a1 from any one parallel portion.

In one embodiment of the present specification, the inclined portion is alternately disposed diagonally in an opposite direction with respect to the flow direction of the supply liquid.

The inclined portion being alternately disposed diagonally in an opposite direction with respect to the flow direction of the supply liquid means that, as in FIG. 2, one inclined portion has an angle of inclination included at an angle of a1 from one parallel portion, and another inclined portion has an angle of inclination inclined at an angle of a2 from another parallel portion.

One embodiment of the present specification provides a separation membrane element including the feed-side flow-channel member described above; a separation membrane; and a permeation-side flow-channel member.

Constituents included in the separation membrane element other than the feed-side flow-channel member are not particularly limited, and constituents used in the art can be properly employed.

In one embodiment of the present specification, the separation membrane element has a differential pressure of 1.3 psi or less under a condition of a membrane area of 400 ft², a temperature of 25° C., a pressure of 225 psi, NaCl 2,000 ppm, and an average flow rate of 44 GPM.

The differential pressure at an average flow rate of 44 GPM is calculated using a regression equation based on an individual differential pressure at a concentrated water flow rate of 10 GPM to 60 GPM. The average flow rate means an arithmetic average value of the feed water flow rate and the concentrated water flow rate.

In the present specification, "GPM" is gallons per minute, and represents a flow rate unit per minute.

Specifically, the differential pressure can be from 1 psi to 1.3 psi or less. More specifically, the differential pressure can be from 1.08 psi to 1.27 psi. More specifically, the differential pressure can be from 1.08 psi to 1.15 psi.

When the differential pressure of the separation membrane element satisfies the above-mentioned condition, extension in the period of CIP (clean in place, wash) conducted when reaching a certain differential pressure and damages on the element caused by a rapid increase in the differential pressure can be reduced compared to plant general differential pressure products treating sewage and wastewater or recycled water, particularly. For reference, repeated CIP can lead to discontinued production of water treatment plant and an increase in the costs of chemicals used in CIP.

In one embodiment of the present specification, the separation membrane element has salt rejection of 99.5% to 99.6% under a condition of 2,000 ppm NaCl, a pressure of 225 psi, and a recovery rate of 15%. Specifically, the salt rejection is from 99.5% to 99.56%.

The salt rejection can be measured using the following calculation formula.

<Calculation Formula>

$$\text{Salt Rejection}(\%) = \frac{\text{Salt Concentration of Product Water (ppm)}}{\text{Salt Concentration of Feed Water (ppm)}} \times 100$$

In one embodiment of the present specification, the separation membrane element is a spiral wound-type separation membrane element in which the feed-side flow-channel member; the separation membrane; and the permeation-side flow-channel member are wound around a center tube.

The being wound around the center tube can mean the feed-side flow-channel member, the separation membrane, and the permeation-side flow-channel member being wound outside the center tube.

The center tube can be expressed as a tube, and the center tube performs a role of a passage through which filtered product water (purified water) is introduced and discharged.

The shape of the center tube is not particularly limited, but is preferably located at the center of the spiral wound-type module. In addition, the center tube can have one side surface open so that the product water is discharged.

In one embodiment of the present specification, the center tube can include a plurality of pores, and when water treatment is progressed using the spiral wound-type module according to one embodiment of the present specification, product water is introduced into the center tube through the plurality of pores of the center tube, and then the introduced product water is discharged through the opened one side surface of the center tube.

A material of the center tube is not particularly limited, and general materials known in the art can be used.

FIG. 1 illustrates a feed-side flow-channel member according to Example 1 and Examples 3 to 6. In the feed-side flow-channel member of FIG. 1, the inclined portion (c) is disposed diagonally in the same direction with respect to the flow direction of the supply liquid. The "being disposed diagonally in the same direction with respect to flow direction of supply liquid" means the inclined portion (c) being disposed at an angle of a1 with respect to the flow direction of the supply liquid.

FIG. 2 illustrates a feed-side flow-channel member according to Example 2. In the feed-side flow-channel member of FIG. 2, the inclined portion (c) is alternately disposed diagonally in the opposite direction with respect to the flow direction of the supply liquid. The "alternately opposite direction with respect to flow direction of supply liquid" means the inclined portion (c) being disposed alternately at angles of a1 and a2 with respect to the flow direction of the supply liquid. In other words, the angle in an opposite direction with respect to the angle of a1 means a2.

FIG. 3 illustrates a feed-side flow-channel member according to Comparative Examples 1 to 3. The feed-side flow-channel member of FIG. 3 is formed in a diamond-type eye unlike the feed-side flow-channel member according to the present specification. Such a diamond-type eye does not include a pair of parallel portions parallel to the flow direction of the supply liquid, and includes an inclined portion disposed in a diagonal direction with respect to the flow direction of the supply liquid.

In FIG. 1 to FIG. 3, "Feed Flow" means "flow direction of supply liquid" according to the present specification.

FIG. 4 illustrates a separation membrane element according to one embodiment of the present specification. Specifically, the separation membrane element is formed including a center tube (40), a feed-side flow-channel member (feed spacer) (20), a separation membrane (10), a permeation-side flow-channel member (30) and the like. When flowing raw water to the separation membrane element, raw water is introduced through the feed-side flow-channel member (20) in the water treatment module. One or more of the separation membranes (10) are extended in an outer side direction from the center tube (40), and wound around the center tube (40). The feed-side flow-channel member (20) forms a passage through which raw water is introduced from the outside, and performs a role of maintaining a space between one separation membrane (10) and another separation membrane (10). For this, the feed-side flow-channel member (20) is in contact with the one or more separation membranes (10) from upper and lower sides, and wound around the center tube (40). The permeation-side flow-channel member (30) generally has a fabric-type structure, and performs a role of a flow channel creating a space through which water purified by the separation membrane (10) flows out. The center tube (40) is located at the center of the water treatment module and performs a role of a passage through which filtered water is introduced and discharged. Herein, a pore having a predetermined size is preferably formed on the outer side of the center tube (40) so that the filtered water is introduced, and forming one or more of the pores is preferred.

Examples

Hereinafter, the present specification will be described in detail with reference to examples. However, examples according to the present specification can be modified to various other forms, and the scope of the present specification is not to be construed as being limited to the examples described below. Examples of the present specification are provided in order to more fully describe the present specification to those having average knowledge in the art.

Preparation Example

Feed-side flow-channel members of Examples 1 to 6 and Comparative Examples 1 to 4 satisfying conditions described in the following Table 1 were each prepared referring to the method for preparing a feed-side flow-channel member described in the reference document "Purchas, D. B.; Sutherland, K. Handbook of Filter Media; Elsevier, 2002 Chapter 6 Screens and Meshes".

Using each of the feed-side flow-channel members, a separation membrane element having a membrane area of 400 ft$^2$ was manufactured.

EXAMPLE AND COMPARATIVE EXAMPLE

Evaluation of Differential Pressure

A differential pressure of the separation membrane element was measured under a condition of a temperature of 25° C., a pressure of 225 psi, NaCl 2,000 ppm, and an average flow rate of 44 GPM, and the results are described in the following Table 1. The average flow rate of 44 GPM is a value obtained by calculating an individual differential pressure value at a concentrated water flow rate of 10 GPM to 60 GPM, and normalizing the result using a regression equation.

Evaluation of Salt Rejection

Salt rejection of the separation membrane element was measured under a condition of a temperature of 25° C., 2,000 ppm NaCl, a pressure of 225 psi, and a recovery rate of 15%, and the results are described in the following Table 1.

Specifically, the salt rejection was calculated using the following calculation formula, and described in the following Table 1.

<Calculation Formula>

$$\text{Salt Rejection (\%)} = \frac{\text{Salt Concentration of Product Water (ppm)}}{\text{Salt Concentration of Feed Water (ppm)}} \times 100$$

TABLE 1

| | Shape of Eye | Angle Formed by Side in Contact with Each other of Inclined Portion (°) | Length of Parallel Portion (mm) | Length of Inclined Portion (mm) | Differential Pressure (psi) | Salt Rejection (%) |
|---|---|---|---|---|---|---|
| Example 1 | Hexagon A | 75 | 3.5 | 5.1 | 1.27 | 99.56 |
| Example 2 | Hexagon B | 75 | 3.5 | 5.1 | 1.27 | 99.5 |
| Example 3 | Hexagon A | 65 | 2.57 | 5.42 | 1.2 | 99.56 |
| Example 4 | Hexagon A | 65 | 3.5 | 5.42 | 1.16 | 99.56 |
| Example 5 | Hexagon A | 55 | 1.44 | 5.7 | 1.15 | 99.56 |
| Example 6 | Hexagon A | 55 | 3.5 | 5.7 | 1.08 | 99.55 |
| Comparative Example 1 | Diamond | 75 | — | 4.56 | 1.93 | 99.57 |
| Comparative Example 2 | Diamond | 60 | — | 5.89 | 1.33 | 99.56 |
| Comparative Example 3 | Diamond | 90 | — | 2.9 | 3.94 | 99.60 |
| Comparative Example 4 | Hexagon A | 75 | 2 | 3.38 | 1.73 | 99.56 |

According to Table 1, it was identified that Examples 1 to 6 had a lower differential pressure compared to Comparative Examples 1 to 4. Accordingly, it was identified that the separation membrane element including the feed-side flow-channel member according to the present specification exhibited superior performance by reducing the differential pressure and optimizing the concentration polarization.

The invention claimed is:

1. A feed-side flow-channel member comprising a network structure, wherein the network structure includes a hexagonal eye;
the hexagonal eye includes a pair of parallel portions parallel to a flow direction of a supply liquid, and an inclined portion disposed in a diagonal direction with respect to the flow direction of the supply liquid;
the parallel portion has a length of 2.57 mm to 3.5 mm;
the inclined portion has a length of 5.4 mm to 5.7 mm; and
an angle formed by sides in contact with each other of the inclined portion is from 50° to 55°.

2. The feed-side flow-channel member of claim 1, wherein the network structure includes a first constituent yarn and a second constituent yarn.

3. The feed-side flow-channel member of claim 1, wherein the hexagonal eye includes a first constituent yarn and a second constituent yarn, and
when the first constituent yarn and the second constituent yarn form the parallel portion, the first constituent yarn and the second constituent yarn are in contact with each other.

4. The feed-side flow-channel member of claim 2, wherein the first constituent yarn and the second constituent yarn each independently have a thickness of 300 μm to 500 μm.

5. The feed-side flow-channel member of claim 1, wherein the inclined portion is disposed diagonally in the same direction with respect to the flow direction of the supply liquid.

6. The feed-side flow-channel member of claim 1, wherein the inclined portion is alternately disposed diagonally in an opposite direction with respect to the flow direction of the supply liquid.

7. A separation membrane element, comprising:
the feed-side flow-channel member of claim 1;
a separation membrane; and
a permeation-side flow-channel member.

8. The separation membrane element of claim 7, which has a differential pressure of 1.3 psi or less under a condition of a membrane area of 400 ft$^2$, a temperature of 25° C., a pressure of 225 psi, NaCl 2,000 ppm, and an average flow rate of 44 GPM,
wherein the differential pressure means a difference between a first pressure when raw water is supplied to the separation membrane element comprising the feed-side flow-channel member and a second pressure of the raw water as it passes on the separation membrane element comprising the feed-side flow-channel member.

9. The separation membrane element of claim 7, which is a spiral wound-type separation membrane element wherein the feed-side flow-channel member, the separation membrane, and the permeation-side flow-channel member are wound around a center tube.

* * * * *